United States Patent [19]

Oguma et al.

[11] Patent Number: 4,986,290
[45] Date of Patent: Jan. 22, 1991

[54] CLEANING DEVICE FOR CONTACT LENS

[75] Inventors: Tomio Oguma, Anjo; Masashi Kai, Tokyo, both of Japan

[73] Assignee: Aisin Seiki Kabushiki Kaisha, Kariya, Japan

[21] Appl. No.: 359,700

[22] Filed: May 31, 1989

[30] Foreign Application Priority Data

| May 31, 1988 | [JP] | Japan | 63-134111 |
| Jun. 21, 1988 | [JP] | Japan | 63-152954 |
| Jun. 22, 1988 | [JP] | Japan | 63-154050 |

[51] Int. Cl.$^5$ .................... B08B 3/04; B08B 11/02
[52] U.S. Cl. .................... 134/95; 134/105; 134/147; 134/158; 134/901
[58] Field of Search .................... 206/5.1; 134/95, 105, 134/117, 121, 147, 154, 158, 184, 186, 187, 188, 140, 901; 422/292, 300

[56] References Cited

U.S. PATENT DOCUMENTS

| 540,696 | 6/1895 | Shober | 134/147 X |
| 2,150,560 | 3/1939 | Ozer | 134/154 |
| 2,845,045 | 7/1958 | Weiskopf | 134/147 X |
| 3,168,100 | 2/1965 | Rich | 206/5.1 X |
| 3,614,959 | 10/1971 | Schollmaier et al. | 206/5.1 |
| 3,690,333 | 9/1972 | Kierner | 134/95 |
| 3,727,620 | 4/1973 | Orr | 134/140 X |
| 4,409,999 | 10/1983 | Pedziwiatr | 134/184 X |
| 4,582,076 | 4/1986 | Prat | 134/95 X |
| 4,637,919 | 1/1987 | Ryder et al. | 422/300 |
| 4,852,591 | 8/1989 | Wisotski et al. | 134/105 X |
| 4,852,592 | 8/1989 | DiGangi et al. | 134/140 X |

FOREIGN PATENT DOCUMENTS 0072257 2/1983 European Pat. Off. ............ 422/292

Primary Examiner—Philip R. Coe
Attorney, Agent, or Firm—Oblon, Spivak, McClelland, Maier & Neustadt

[57] ABSTRACT

A cleaning device for a soft type contact lens includes a housing having a cleaning chamber fed with a cleaning liquid, a lens receiving container within the cleaning chamber and a stirring device for generating a liquid flow within the cleaning chamber and for cleaning said contact lens with the liquid flow. In order to clean the contact lens, a high speed liquid flow is generated, so that four kinds of processes of cleaning, rinsing, sterilizing, and preserving are carried out automatically within only one cleaning chamber without moving the contact lens. Therefore the lenses are not stained with dirt when moving them by finger from one process or place to another.

4 Claims, 10 Drawing Sheets 4,986,290

CLEANING DEVICE FOR CONTACT LENS

BACKGROUND OF THE INVENTION

1. Field of the Invention

The present invention relates to a cleaning device for contact lens.

2. Background of the Related Art

In order to clean a contact lens, in general, the contact lens taken off of a naked eye is held by the palm of a hand or the tip of finger, and is cleaned by dropping a cleaning liquid on its surface, followed by rubbing the contact lens with the tip of a finger. Dirt and particularly protein contaminants stained on the surface of a contact lens are thereby removed. After removal from the tip of a finger, the contact lens is rinsed with a rinsing liquid such as distilled water or the like. Thereafter, it is sterilized by heating it in a preserving liquid such as a physiological saline solution or the like. After sterilizing, the contact lens is preserved in a preserving solution such as a physiological saline solution until the next morning.

Recently, as a cleaning device for a contact lens, there have been developed an ultrasonic wave cleaner which cleans the contact lens with ultrasonic waves, and a cleaner which operates by a method for rubbing the surface of the contact lens in an elastic tray manually by holding the elastic tray.

However, there has been a problem that the cleaning of the contact lens could not be carried out efficiently by finger as aforementioned because, for example, dirt from the finger stains the surface of the contact lens. In the ultrasonic cleaner and the cleaner using the elastic tray system, even though they have the advantage that the contact lens need not be rubbed by a finger during cleaning, they cannot efficiently clean the contact lens. Particularly in case of a soft contact lens, the dirt on the surface of the contact lens cannot be entirely removed even if ultrasonic cleaning is carried out because it is formed of a soft material.

Furthermore, in a cleaner of said ultrasonic system and a cleaner of said elastic tray system, they are merely intended for cleaning the lens. For that reason, in case either rinsing or heat sterilizing of the contact lens must be performed after cleaning it, the lens has to be moved to another place or another device while holding the contact lens with the fingers, and dirt from the fingers may then stain the contact lens. As a result, known techniques are still insufficient to efficiently execute the cleaning of the contact lens.

SUMMARY OF THE INVENTION

Therefore, it is a primary object of the present invention to provide a cleaning device for a contact lens capable of efficiently carrying out the cleaning of the contact lens.

The above, and other, objects are carried out by a cleaning device for a contact lens, comprising a housing having a cleaning chamber which may be fed with a cleaning liquid, a lens receiving means adapted for receiving a contact lens, and which may be disposed within the cleaning chamber of the housing, and a stirring means for generating a liquid flow within the cleaning chamber, whereby the contact lens is cleaned by the liquid flow.

BRIEF DESCRIPTION OF THE DRAWINGS

For a better understanding of the invention and to show how the same may be carried into effect, reference will be made, by way of example, to the accompanying diagramatic drawings, in which.

DETAILED DESCRIPTION OF PREFERRED EMBODIMENTS

Hereinafter, a cleaning device for a contact lens according to the present invention will be described in detail based on a first embodiment of the invention illustrated in FIGS. 1 to 11. The cleaning device of this embodiment is suitable for cleaning a soft contact lens.

Figure 1:
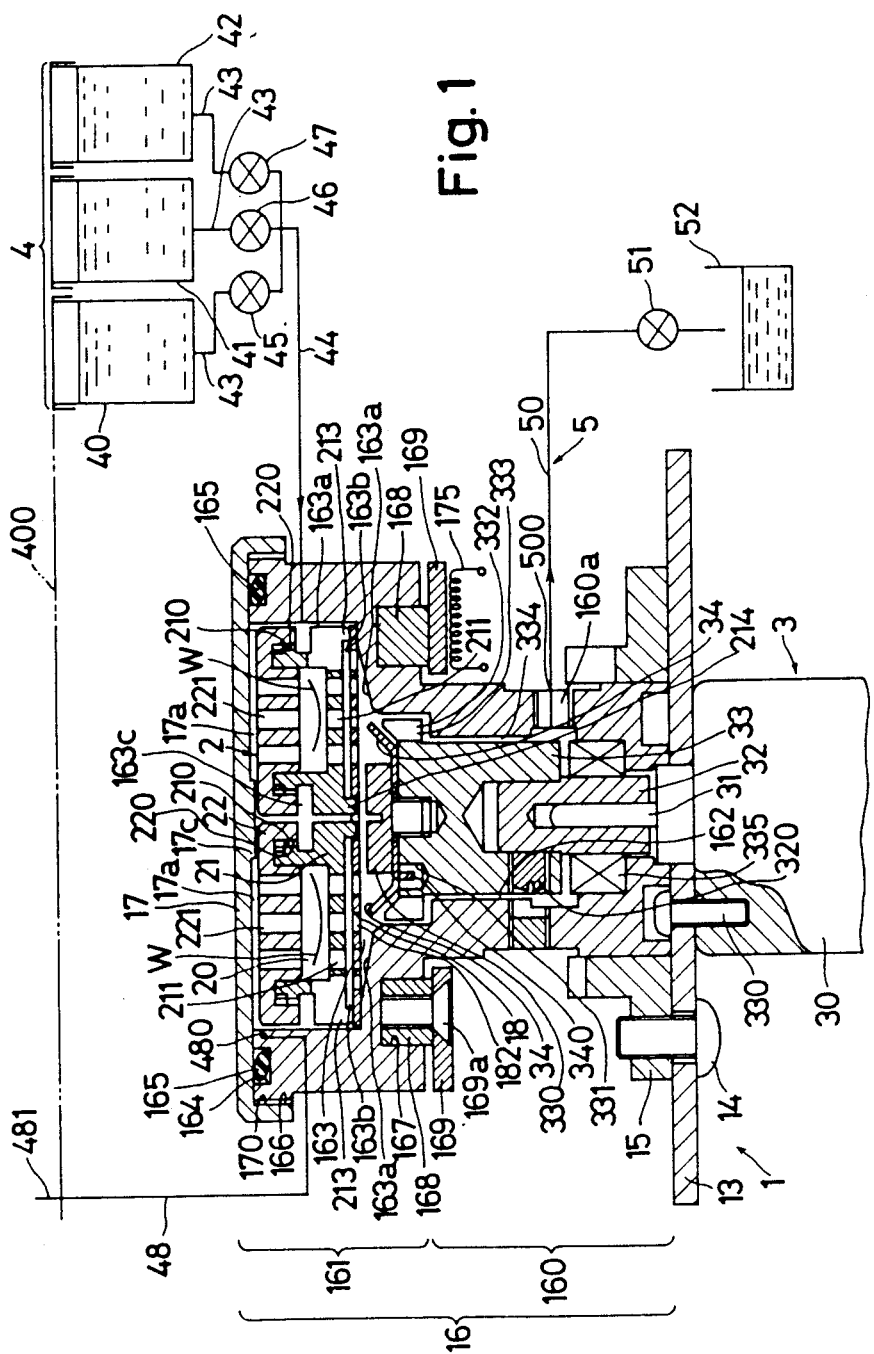
FIG. 1 is a cross sectional view of the essential part of a first embodiment of the present invention.
Figure 11:
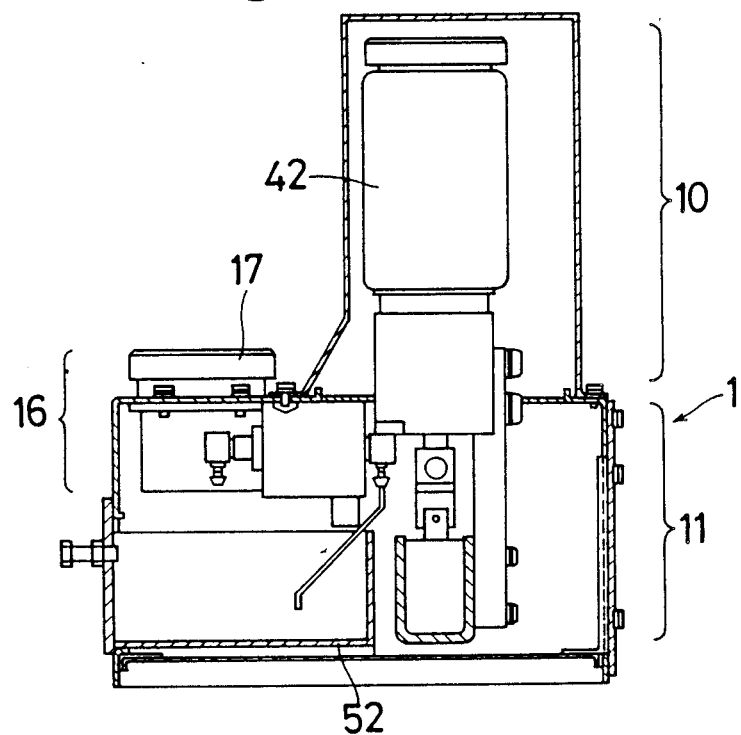
FIG. 11 shows a cross sectional view of entire device of the first embodiment of the present invention.

The cross sectional view of an essential part of the cleaning device of this embodiment is shown in FIG. 1, and the cross sectional view of the entire device is shown in FIG. 11. As shown in FIG. 1, the cleaning device of this embodiment is comprised of: a housing 1, a lens receiving means 2 for receiving the contact lens W, a stirring means 3 for generating a liquid flow, a feeding means 4 for separately feeding a cleaning liquid and a preserving liquid respectively, and a discharging means 5 for discharging separately a cleaning liquid and a preserving liquid respectively. Hereinafter, a detailed explanation will be added for all structural elements.

The housing 1 will be explained first. As shown in FIG. 11, the housing 1 includes an upper housing 10 and a lower housing 11. As shown in FIG. 1, the housing 1 is comprised of a horizontally extending fixed base 13, a cylindrically shaped holding base 15 fixed to the fixed base 13 with a screw 14, and a lens holding cylinder means 16 held by the holding base 15. The lens holding cylinder means 16 is formed with a smaller cylindrical part 160 positioned at a lower position and an upper, larger cylindrical part 161 having a larger diameter than the smaller cylindrical part 160. A driving chamber 162 is formed in the interior of the smaller cylindrical part 160. A cleaning chamber 163 having an open top is formed in the larger cylindrical part 161 and communicates with the driving chamber 162. A bottom surface 163a of the cleaning chamber 163 is inclined downwardly toward the driving chamber 162 so that liquids can fully drain from the cleaning chamber 163. A sealing groove 164 is formed around the cleaning chamber 163 and a ring-shaped sealing member 165 is fitted in the sealing groove 164.

A threaded portion 166 is formed around the external periphery at the top edge of the larger cylindrical part 161, and the threaded portion 170 of a cap 17 is screwed into the threaded portion 166 so that the cap 17 is releasably fixed to the lens holding cylinder 16, to thereby close the top side of the cleaning chamber 163. In this case, a gap between the cap and the lens holding cylinder 16 is sealed by the sealing member 165 to be water tight.

Figure 2:
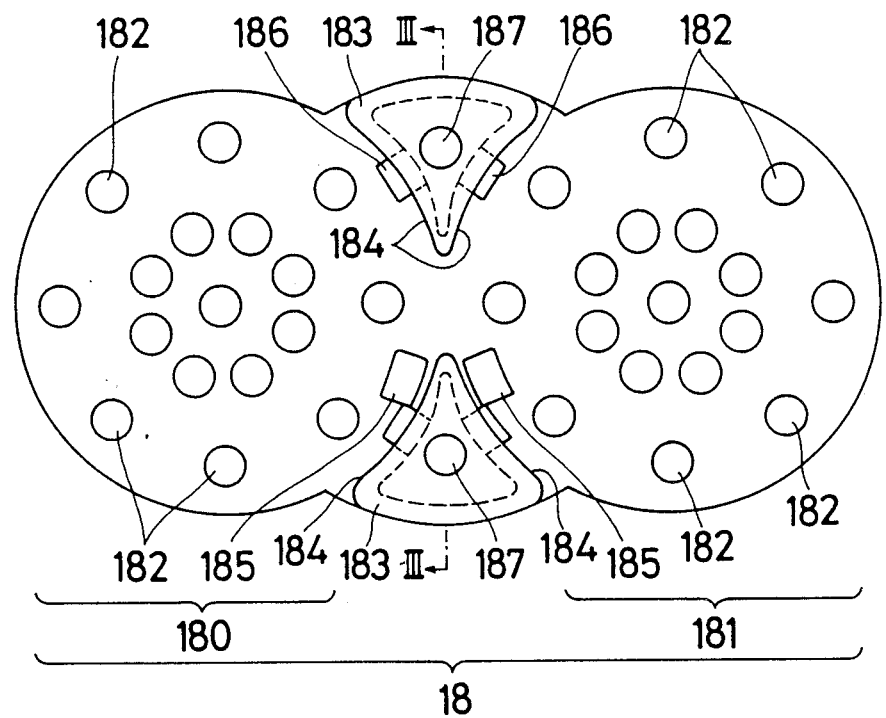
FIG. 2 shows a plan view of the receiving plate.
Figure 3:
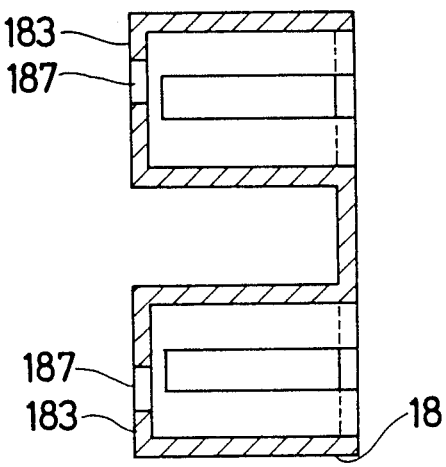
FIG. 3 is a cross sectional view take along III—III line in FIG. 2.
Figure 8:
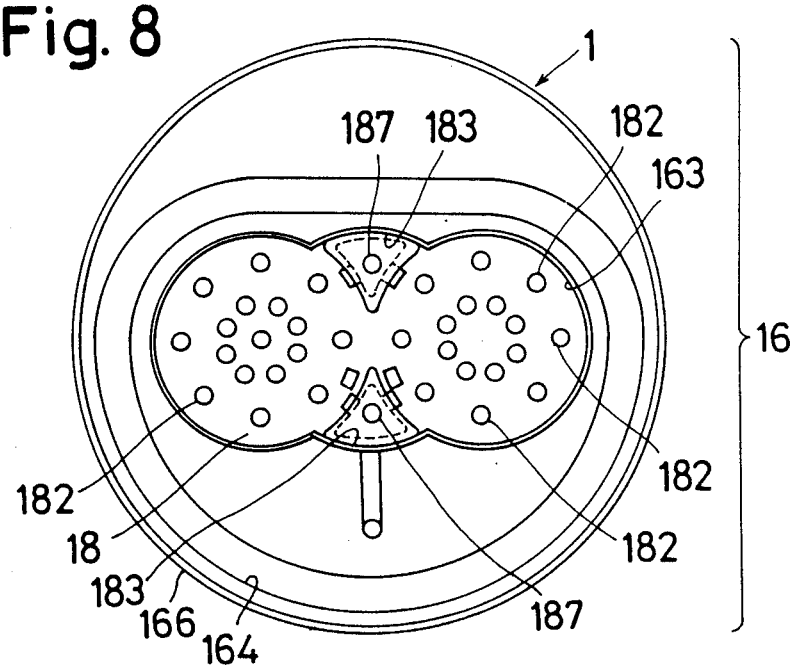
FIG. 8 is a plan view showing a state before setting a lens receiving means to a cleaning chamber.

A receiving plate 18 is held substantially in a horizontal position at the bottom of the cleaning chamber 163. A plan view of this is shown in FIG. 8. A plan view of the receiving plate 18 itself is shown in FIG. 2, and a cross sectional view taken along the line III—III in FIG. 2 is shown in FIG. 3. As shown in FIGS. 2 and 3, the receiving plate 18 is formed with a first receiving part 180 and a second receiving part 181, both of circular arc shape. A number of circular liquid holes 182 are formed in both the first receiving part 180 and the second receiving part 181. Two flat triangle-shaped, upwardly extending protrusions 183 are formed at the boundary portion between the first receiving part 180 and the second receiving part 181. A circular arc-concave-shaped guide surface 184 is formed at the side surface of each protrusion 183. Hooking holes 185 and liquid holes 186 are also formed in the receiving plate 18. Circular liquid holes 187 are also formed on the top surfaces of the protrusions 183.

As shown in FIG. 1, an annular heating block 186 made of aluminum alloy is inserted with pressure in the recess 167 on the bottom surface of the larger cylindrical part 161 so as to be positioned around the smaller cylindrical part 160. This is advantageous for enhancing heating efficiency because the heating block 168 can be made to approach extremely close to the cleaning chamber 163 by use of the recess 167. Further, an annular heater plate 169 is fixed to the heating block 168 by screws 169a. A heater 175 is energized by a microprocessor (micom) of a control circuit (not shown). It is turned ON by a timer of the micom, and is set to heat for a predetermined period of time.

Next, the lens receiving means 2 will be explained in detail. Two lens receiving means 2 are respectively provided at the right and left of the contact lens opposite to each other. Each lens receiving means 2 is a release free type, which may be inserted into the cleaning chamber 163 of the housing 1 when the cap 17 is opened. The lens receiving means 2 is formed with a container-shaped case 21 having a top side opened lens receiving chamber 20 for receiving the contact lens W, and a cap 22 covering the lens receiving chamber 20. A threaded portion 210 is formed on the external periphery of the case 21, and a threaded portion 220 is formed on the internal periphery of the cap 22. The cap 22 can thus be releasably fixed to the case 21 by screw coupling together the threaded portions 210, 220.

Figure 4:
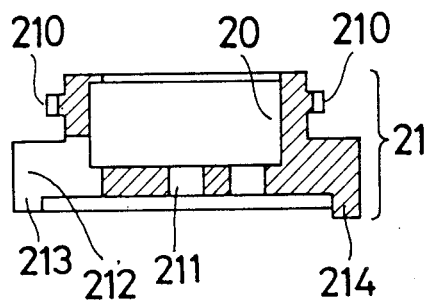
FIG. 4 shows a cross sectional view of a case.
Figure 5:
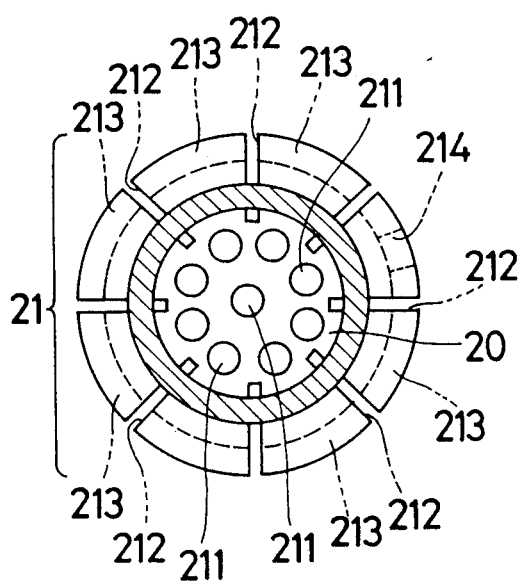
FIG. 5 shows a bottom view of a case.

A cross sectional view of the case 21 is shown in FIG. 4, and a bottom view of the case 21 is shown in FIG. 5. As shown in FIGS. 4 and 5, a plurality of circular liquid holes 211 are formed adjacent to the central portion of the bottom of the case 21 so that the bottom is pierced through in the vertical direction. A plurality of slit-like liquid holes 212 are also formed radially outward of the liquid holes 211 and penetrate radially inwardly. Protrusions 213 and guide protrusion 214 are formed on the bottom of the case 21 and are spaced by the holes 212 in the direction of circumference with predetermined distance intervals. Here, the case 21 is circumferentially located by coupling the guide protrusion 214 with one of the hooking hole 185 of receiving plate 18 when placing the case 21 on the receiving plate 18. Thus, since the guide protrusion 214 is coupled to the hooking hole 185 of the receiving plate 18, the case 21 is surely located, so that rotation of the case 21 can be prevented. Also, the flowing in of a liquid can be smoothly carried out because the liquid holes of receiving plate 18 and the liquid holes 211 of case 21 can be made coaxial.

Figure 6:
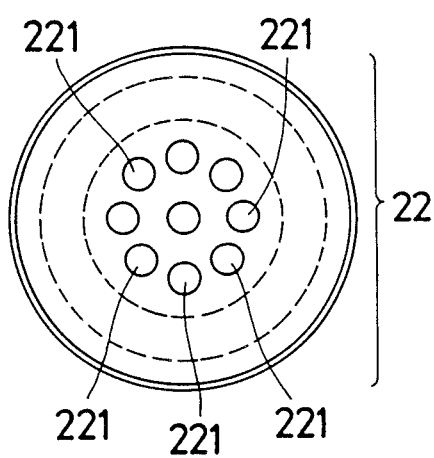
FIG. 6 shows a plan view of a cap.
Figure 7:
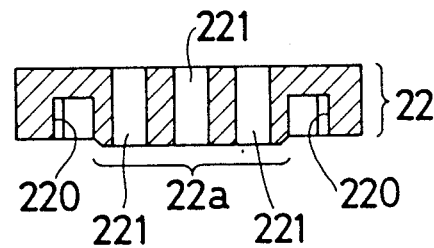
FIG. 7 shows a cross sectional view of a cap.

A plan view of the cap 22 is shown in FIG. 6, and a cross sectional view of the cap 22 in FIG. 7. As shown in FIGS. 6 and 7, a plurality of circular liquid holes 221 are formed to perforate the fitting portion 22a of the center of cap 22. The fitting portion 22a is adapted to fit into the case 21. The cap 22 and the case 21 are formed from a polysulfon resin for the purpose of preventing damage of the contact lens. Furthermore, as shown in FIG. 1, when the lens receiving means 2 is set in the cleaning chamber 163, a liquid path 17a is formed between the lens receiving means 2 and the cap 17, and a liquid path 163d is formed between the internal wall surface of the cleaning chamber 163 and the external wall surface of the lens receiving means 2.

As shown in FIG. 1, the stirring means 3 serves as a cleaning means for cleaning the contact lens W within the cleaning chamber 163. The stirring means 3 is comprised of: a motor 30, a rotary shaft 32 inserted with pressure into the motor shaft 31 of the motor 30, a rotary shaft 33 coupled coaxially to the top end of the rotary shaft 32 by a fixing means 320, and stirring wing 34 for generating a liquid flow fixed to the top end of the rotary shaft 33 by fixing screw 330. A protrusion 340 for inhibiting free rotation is formed in the stirring wing 34, said rotation inhibiting protrusion 340 being inserted into the hooking hole 331.

A predetermined clearance is formed between the stirring wing 34 and the receiving plate 18 in consideration of the generation of liquid flow. The motor 30 is fixed at the fixed base 13 by screws 330A. Rotary shafts 32 and 33 are arranged in the driving chamber 162 of the smaller cylindrical part 150. In this embodiment, a projection 332 is formed at the external periphery of the top end of the rotary shaft 33 so as to project outwardly. The projection 332 has the effect of reducing the volume of the cleaning chamber 163 and so decreasing the quantity of cleaning liquid therein. Therefore, it has advantage of saving expensive cleaning liquid.

A plurality of slits 333 for discharging the liquid are formed at the projection 332. A liquid path 334 is formed between the external periphery of said rotary shaft 33 and the internal periphery of the smaller cylindrical part 160. The liquid path 334 is communicated with the cleaning chamber 163, and also with the liquid discharging hole 160a of the smaller cylindrical part 160. A sealing member 335 is interposed between the external periphery of the rotationary shaft 32 and the internal periphery of smaller cylindrical part 160, so that it prevents the liquid of the liquid path side from entering the motor 30 side of the seal.

As shown in FIG. 1, the feeding means 4 is comprised of: a cleaning liquid tank 40 for storing a cleaning liquid such as a liquid soap, a rinsing liquid tank 41 for storing a rinsing liquid such as distilled water, a preserving liquid tank 42 for storing a preserving liquid such as a physiological saline solution, first feeding pipes 43 communicated with respective tanks 40, 41, 42, a second feeding pipe 44 communicated with said first feeding pipes 43 and the cleaning chamber 163, opening and closing valves 45, 46, 47 disposed in the first feeding pipes 43, and an air opening pipe 48 communicating the cleaning chamber 163 to the atmosphere. The bottoms of respective tanks 40, 41, 42 are positioned upward from the cap 17 so as to gravity feed the liquids within the tanks 40, 41, 42 to the cleaning chamber 163. The air opening pipe 48 is for discharging the air within the cleaning chamber 163 to the atmosphere. One end 480 of the air opening pipe 48 is opened at the top end portion of the cleaning chamber 163, that is, adjacent to the cap 17. The opening of other end 481 of the air opening pipe 48 is positioned above the lens receiving means 2 so that liquid will not be discharged outwardly therefrom, and also it is positioned upward from the uppermost liquid surface 400, which is the fully charged liquid surface of said tanks 40, 41, 42.

Next will be explained the discharging means 5. The discharging means 5 is for discharging the cleaning liquid, rinsing liquid and preserving liquid within the cleaning chamber 163, separately. The discharging means 5 is comprised of: a discharging pipe 50 communicating with the water path 334 which communicates with the cleaning chamber 163, an opening and closing valve 51 disposed in the discharging pipe 50, and a discharging tank 52 for storing the drainage discharged from the discharging pipe 50. One end 500 of the discharging pipe 50 is connected to the liquid discharging hole 160a of the smaller cylindrical part 160, and located at the lowermost portion of the liquid path 334 so that no liquid remains within the liquid path 334. Therefore, the cleaning chamber 163 is communicated to the tank 52 through the liquid discharging hole 160a and the discharging pipe 50.

Further, a control circuit having a micom is provided in the housing 1. The motor 30, opening and closing valves 45, 46, 47 and 51, and heater 175 are controlled by the micom of this control circuit.

Hereinafter will be explained in detail a way of using the cleaning device for a contact lens according to this embodiment:

(A) Preparation

Figure 9:
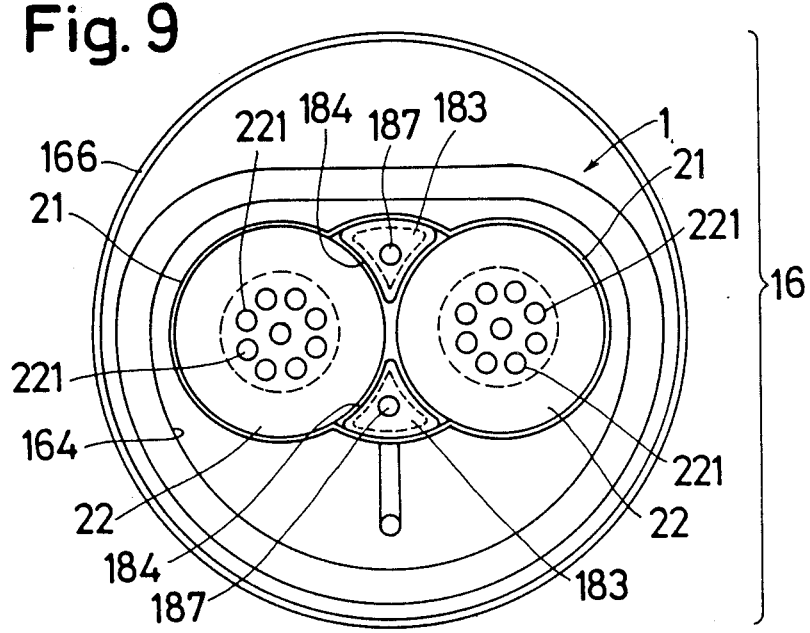
FIG. 9 is a plan view showing a state holding the lens receiving means to the cleaning chamber.

At first, a cleaning liquid is stored in the cleaning liquid tank 40, a rinsing liquid in the rinsing liquid tank 41, and a preserving liquid in the preserving liquid tank 42, respectively. At the same time, a contact lens W of the soft type is received in the lens receiving chamber 20 of the case 21 removed from the cleaning chamber 163, and the cap 22 is fixed to the case 21. The guide protrusion 214 of the case 21 is then coupled with the hooking hole 185 of the receiving plate 18, as aforementioned, as the case 21 is placed on the receiving plate 18 within the cleaning chamber 163. At this moment, as shown in FIG. 1, a liquid path 163bis formed between the bottom surface of the case 21 and the receiving plate 18 by the protrusions 113, and also a liquid path 163c is formed between the cases 21. A plan view showing the cases 21 placed on the receiving plate 18 is shown in FIG. 9. When the lens receiving means 2 is placed on the receiving plate 18, the protrusions 183 of the receiving plate 18, particularly the guide surfaces 184 of the protrusions 183, aid in the guiding operation.

Thereafter, the cleaning chamber 163 is covered by fixing the cap 17. At this moment, the gap between the cap 17 and the cleaning chamber 163 is sealed by the sealing member 165.

The valve 51 is opened and closed to assure complete drainage of residual preserving liquid from the cleaning chamber 163.

(B) Cleaning

Figure 10:
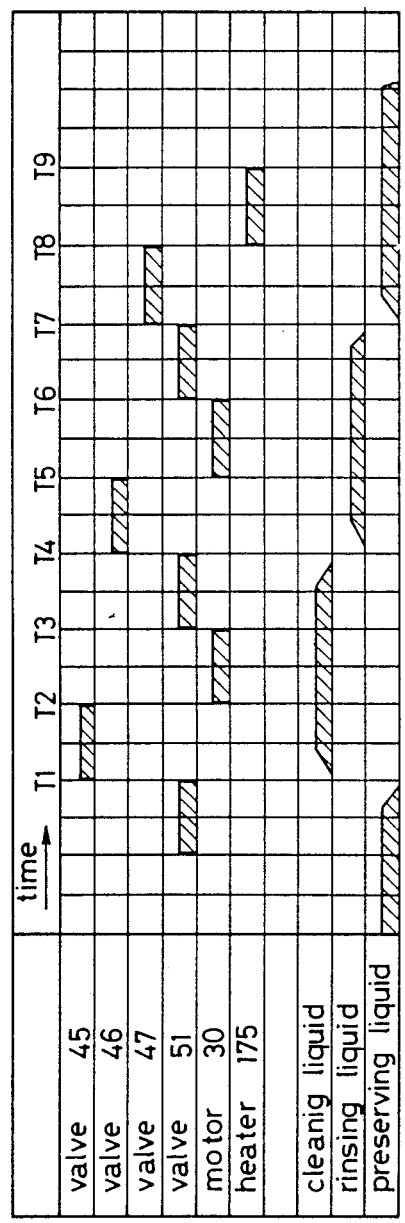
FIG. 10 is a timing chart.

The opening and closing valve 45 for cleaning liquid is opened by handling a switch (not shown). A time chart of the process thereafter is shown in FIG. 10, and the cleaning operations will be explained by referring the time chart in FIG. 10 hereinafter. The valve 45 is opened during the period from T1 to T2 by a timer of the micom. Then, the cleaning liquid in the cleaning liquid tank 40 passes by gravity through the first feeding pipe 43 and the second feeding pipe 44, and is fed into the cleaning chamber 163. At this moment, the cleaning liquid also flows down into the liquid path 334. The cleaning chamber 163 is substantially filled by the cleaning liquid. At this time, the air in the cleaning chamber 163 is discharged to the atmosphere via the opening pipe 48. At the same time, the cleaning liquid in the cleaning chamber 163 is not discharged out of the discharging pipe 50 because the opening and closing valve 51 of the discharging means 5 is closed.

As described above, when the interior of the cleaning chamber 163 is filled fully with the cleaning liquid, the cleaning liquid flows into the lens receiving chamber 20 through the liquid holes 211, 212 of the case 21 and the liquid holes 221 of the cap 22, so that cleaning liquid flows around the contact lens W.

In FIG. 10, in the period from time T2 to time T3, the motor 30 is energized to rotate by the timer of the micom. The rotary shafts 32 and 33 thus rotate, and then the stirring wing 34 rotates at about 8000 r.p.m. within the cleaning chamber 163. As a result, the cleaning liquid in the cleaning chamber 163 is agitated so that it becomes a high speed liquid flow. The high speed liquid flow passes through the water holes 182 of the receiving plate 13 and the water holes 211 of the case 21, and then it flows into the lens receiving chamber 20 of the case 21 from the bottom side of the contact lens W. The liquid flow also passes through the liquid paths 163d and 17a, and then through the liquid holes 221 of the cap 22, after which it flows into the lens receiving chamber 20 at the top side of the contact lens. The liquid flow thus intersects both surfaces of the contact lens W within the lens receiving chamber 20, so that the dirt stained on the surfaces of the contact lens can be eliminated.

The liquid flow which has flowed into the lens receiving chamber 20 is mainly discharged to the outside of the case 21 through the radially extending holes 212 of the case 21. Thus, the liquid flow circulates with high speed around the contact lens W while the motor is being driven. In this embodiment, the elimination of the dirt is made more effective because fine bubbles of air are contained in the water flow.

The rotation of the motor 30 is made to stop at the time T3. In the period between the time T3 and the time T4, the opening and closing valve 51 of the discharging means 5 is turned ON by the timer of the micom and so is opened. As a result, the cleaning liquid in the cleaning chamber 163 is discharged into the discharging tank 52 through the liquid path 334 and the discharging pipe 50, and then the cleaning process is terminated. At this moment, almost all of the cleaning liquid is discharged because the bottom 163a of the cleaning chamber 163 is inclined downwardly, and the liquid discharging hole 160a communicated with the discharging pipe 59 is located at the lowermost portion of the liquid path 334.

(C) Rinsing

Since the opening and closing valve 46 for rinsing is turned ON by the timer of the micom and is opened from the time T4 to the time T5, the rinsing liquid in the rinsing tank 41 drains by gravity and is fed to the cleaning chamber 163 through the first feeding pipe 43 and the second feeding pipe 44. Accordingly the cleaning chamber 163 is filled to be full with the rinsing liquid.

The motor 30 is rotated by the timer of the micom in the period between the time T5 and the time T6. The stirring wing 34 is rotated by this rotation of the motor and high speed liquid flow of the rinsing liquid is generated within the cleaning chamber 163. Thereafter the high speed liquid flow passes through the holes 182 of the receiving plate and the water holes 211 of the case 21, and it flows into the lens receiving chamber 20 from the bottom side of the contact lens as aforementioned. Further, flow of the rinsing liquid flows into the lens receiving chamber 20 from the top side of the contact lens W by passing through the liquid path 163d and the liquid path 17a as aforementioned. It then passes through the water holes 221 of the cap 22. Consequently, the flow of the high speed rinsing liquid intersects both surfaces of the contact lens, and the rinsing of the contact lens W is carried out.

The opening and closing valve 51 of the discharging means 5 is turned On by the timer of the micom in the period between the time T6 and the time T7 and so is opened. For that reason, the rinsing liquid in the cleaning chamber 163 is discharged into the discharging tank 52 through the water path 334 and the discharging pipe 50, and thereby the rinsing process is terminated.

(D) Preservation

Since the opening and closing valve 47 for preserving liquid is turned ON by the timer of the micom in the period from the time T7 to the time T8 and is then opened, the preserving liquid in the preserving tank 42 is fed to the cleaning chamber 163 through the first feeding pipe 43 and the second feeding pipe 44, and the interior of the cleaning chamber 163 is filled with the preserving liquid.

The heater 175 is turned ON by the timer of the micom at time T8. For that reason, the heat of the heater 175 is transmitted to the preserving liquid in the cleaning chamber 163 through the heating block 168 and the larger cylindrical part 161. The preserving liquid in the cleaning chamber 163 is thus boiled, so that sterilizing by boiling of the contact lens is carried out. The sterilizing by boiling is carried out until the time T9 illustrated in FIG. 10. The contact lens W is maintained in this state until the next morning. In order to use the contact lens, the cap 17 is released and the lens receiving means 20 are taken out of the cleaning chamber 163. The cap 22 is then unscrewed from the case 21 and the contact lens W therein taken out. When the lens receiving means 20 is taken out of the cleaning chamber 163, the liquid in the case 21 is discharged naturally to the outside of the case 21 through the water holes 211 and 212.

As described above, in this embodiment, the cleaning of the dirt stained the surface of the contact lens W can be carried out efficiently relative to the cleaner of the ultrasonic cleaning method and the cleaner of the method executing cleaning with the elastic tray because the cleaning and the rinsing of the contact lens W is carried out by the high speed liquid flow.

Furthermore, in this embodiment, the rinsing of the contact lens W can be carried out efficiently because the rinsing of the contact lens W is carried out by the high speed liquid flow.

Particularly, in this embodiment in which the liquid holes 211 are formed at the case 21, and the liquid holes of the cap are formed, as shown in FIG. 1, the liquid holes 221 are provided at the top of the contact lens laid laterally, and this liquid holes 212 are provided at the bottom of the contact lens laid laterally, it is possible to clean by flowing the high speed liquid flow substantially perpendicular to the front and rear surfaces of the contact lens W from above and below the contact lens W, and therefore the cleaning degree of the dirt from the contact lens is extremely high.

Furthermore, in this embodiment, for cleaning the contact lens W, since the cleaning liquid, the rinsing liquid, and the preserving liquid can be fed separately to the cleaning chamber 163, and separately discharged therefrom, the rinsing, sterilizing, and preserving steps can be carried out automatically in a single cleaning chamber 163. Therefore, it is not required to move the lens to another device or to another location while holding the contact lens W with fingers for the purpose of rinsing and preserving. This is different from the conventional ultrasonic cleaner and elastic tray method which have only the cleaning function. Therefore, the problem by which the contact lens is stained by a finger upon moving to another process that has arisen in the conventional ultrasonic cleaning method and the method using an elastic tray cleaning is eliminated, and the cleaning of the contact lens W can be carried out efficiently.

In addition, in this embodiment, since the cap 22 is screwed onto the case 21, and the cap 17 is screwed onto the lens holding cylindrical means 16, even if the high speed liquid flow is generated for cleaning, the releasing of the cap 22 and the cap 17 can be surely prevented.

Moreover, in this embodiment, as shown in FIG. 1, since the liquid paths 334, 163d, 17a, 163b have small gaps it has an advantage for saving of the the cleaning liquid, rinsing liquid, and preserving liquid, and it is also advantageous for decreasing running cost.

Furthermore, in this embodiment, since the guide protrusion 214 of the case 21 can be coupled with the hooking hole 185 of the receiving plate 18, and the expanded out portion 17c of the internal surface of the cap 17 can approach the case 21, even if the liquid flow is of high speed, the clatter of the case 21 is suppressed.

Figure 13:
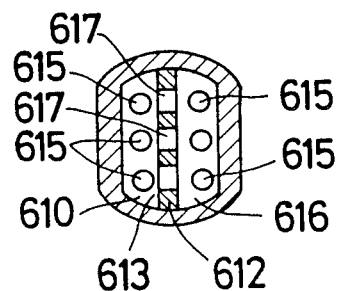
FIG. 13 is a cross sectional view taken along the line XIII—XIII in FIG. 12.
Figure 12:
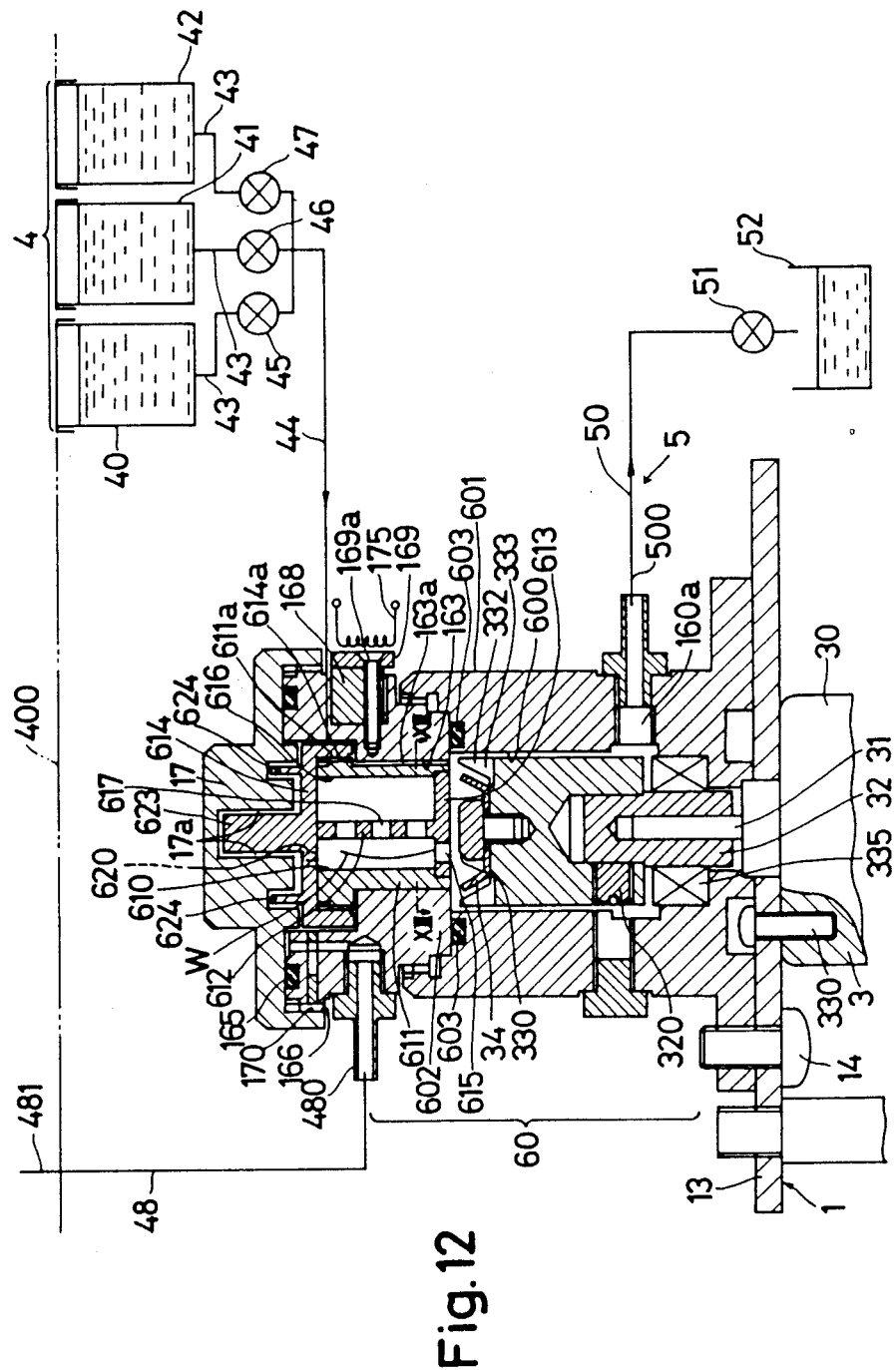
FIG. 12 is a cross sectional view of the essential part of a second embodiment of the invention.

A second embodiment of the cleaning device for the contact lens according to the present invention is shown in FIG. 12, and the cross sectional view taken along the line XIII—XIII in FIG. 12 is shown in FIG. 13. The cleaner of the embodiment shown in FIGS. 12 and 13 is suitable for cleaning a contact lens of soft type, and it is basically the same structure with the cleaner of the first embodiment. It cleans the surface of the contact lens W with the high speed liquid flow, and therefore it has the operational effect that the cleaning of the contact lens can be carried out efficiently.

Hereinafter, the same reference numbers designate the same elements as in the first embodiment, and only differences will be explained. That is to say, the second embodiment is of a type where the contact lens W is placed vertically. In the second embodiment, as shown in FIG. 12, a lens holding cylinder means 60 is fixed to a fixed base 13 of the housing by screw 14. The lens holding cylinder means 60 is formed with a first cylindrical part 601 having a driving chamber 600 and a second cylindrical part 602 continuously arranged with the first cylindrical part 601. A ring-shaped sealing member 603 is interposed between the first cylindrical part 601 and the second cylindrical part 602, so that it is made to be liquid tight. A cleaning chamber 163 is formed in the second cylindrical part 602 in communication with the driving chamber 600.

A lens receiving means 13 is releasably fixed in the cleaning chamber 163, and it is comprised of: a case 611 having a first lens receiving chamber 610 and second lens receiving chamber 616, a bottom part 613 fixed at the bottom of the case 611 and having a partitioning plate 612 dividing the first lens receiving chamber 610 and the second lens receiving chamber 616, and a cap 614 for covering the first lens receiving chamber 610 and the second lens receiving chamber 616. As shown in FIG. 12, a threaded portion 614a is formed in the cap 614 and a threaded portion 611a is formed at the case 611, and the cap 614 is fixed to the case 611 by the screw coupling of the threaded portions 611a and 614a. Further, the first lens receiving chamber 610 and the second lens receiving chamber receiving chamber 616 have the same volume as shown in FIG. 12 (although it seems the volumes are different in the cut out sectional view in FIG. 12).

As shown in FIG. 13, liquid holes 615 are formed at the bottom plate 613, and liquid holes 617 are formed at the partitioning plate 612. Here, the diameter of the liquid holes 615 are provided to be small so as to prevent the contact lens W from falling through the holes. Liquid holes 620 are also formed in cap 614 to be screwed into the case 611. A knob projection 623 for handling and a liquid isolation plate 624 are formed on the top surface of the cap 614. The liquid isolation plate 624 prevents the liquid in the cleaning chamber 163 from entering the air opening pipe 48.

In this second embodiment, the contact lenses W are vertically inserted respectively into the first lens receiving chamber 610 and to the second lens receiving chamber 616 of the case 611 with the cap 614 removed. As in the first embodiment, when the stirring wing 34 is rotated by the motor 30, the cleaning liquid or the rinsing liquid in the cleaning chamber 163 create a high speed fluid flow, which flows into the first lens receiving chamber 610 and the second lens receiving chamber 616 through the water holes 615. Therefore, the contact lens W within the first lens receiving chamber 610 and the contact lens W within the second lens receiving chamber 616 are cleaned.

Figure 14:
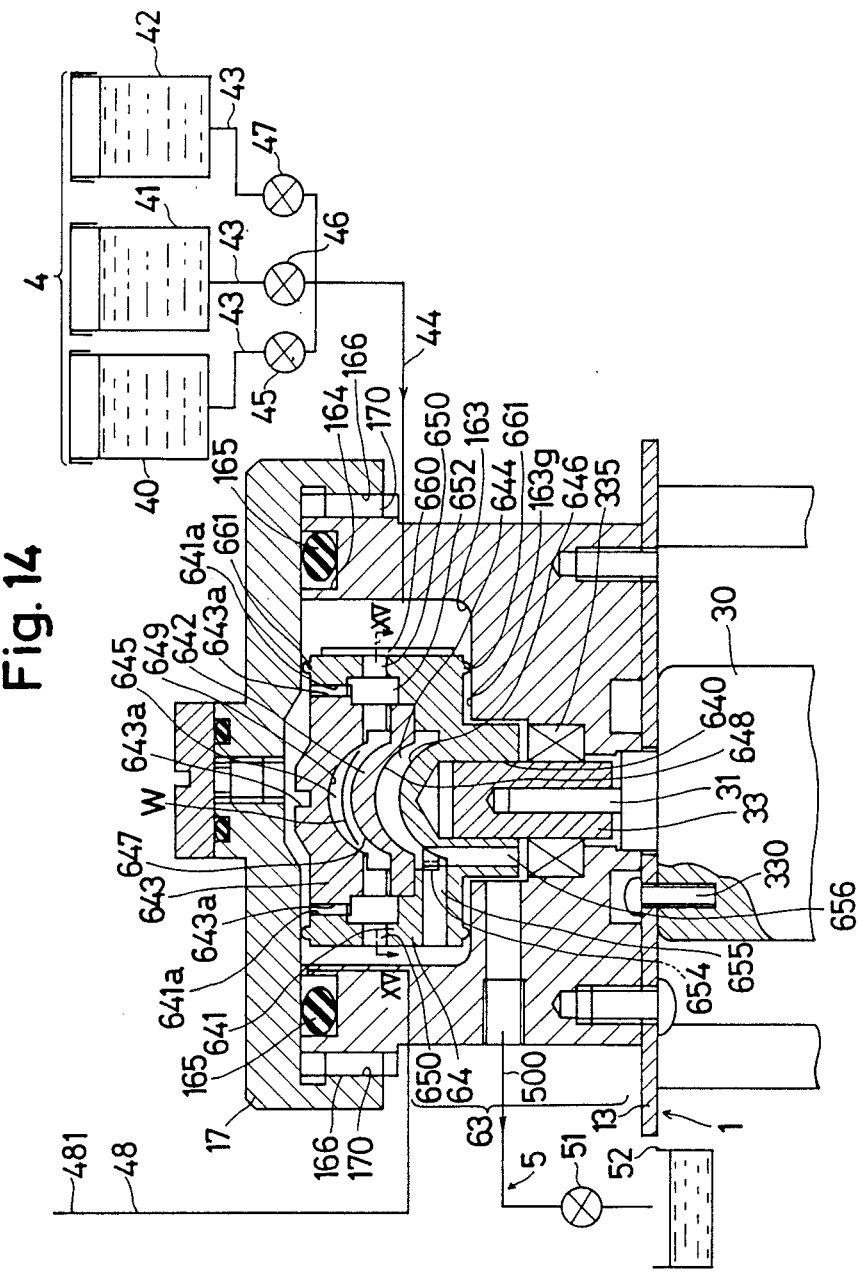
FIG. 14 is a cross sectional view of the essential part of a third embodiment of the invention.
Figure 15:
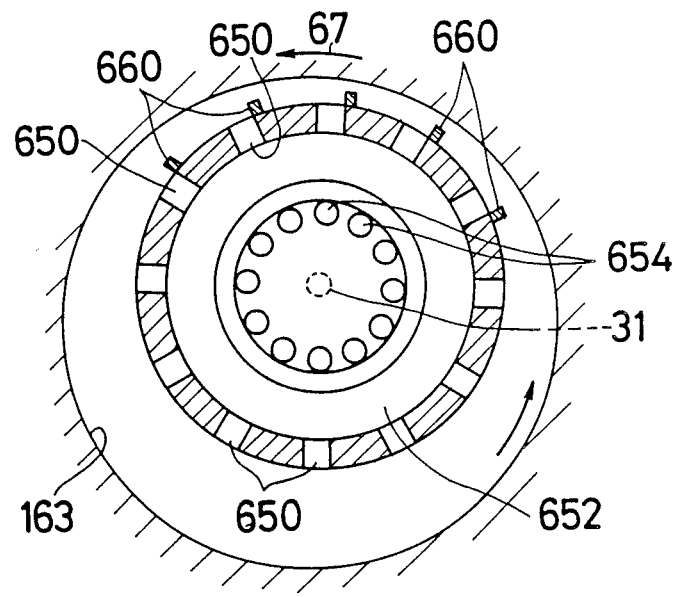
FIG. 15 is a cross sectional view taken along the line XV—XV in FIG. 14.

A third embodiment of the cleaning device of the contact lens according to the present invention is shown in FIG. 14, and a cross section taken along the line XV—XV in FIG. 14 is shown in FIG. 15. The cleaner of this embodiment shown in FIGS. 14 and 15 cleans the contact lens W with high speed liquid flow as does the cleaner of the first embodiment, and therefore the same operation and effect are brought about as in the first embodiment. Hereinafter, the same reference numerals are designated for the same elements as in the first embodiment, and only differences will be explained.

In the third embodiment, the high speed liquid flow is generated by rotating the lens receiving means 64 which contains the contact lens W. That is to say, in this third embodiment, a cleaning chamber 163 is formed in the top portion of the lens holding cylinder means 63 fixed to the fixed base 13 of the housing 1. As shown in FIGS. 14 and 15, the cleaning chamber 163 is not coaxial with the motor shaft 31 of the motor 30, but is eccentric by a predetermined amount. A rotary shaft 33 is releasably fixed to the motor shaft 31 of the motor.

The lens receiving means 64 is releasably mounted in the cleaning chamber 163. The lens receiving means 64 is formed with a case 641 having a holding hole 640 and a curved surface 646. It further includes a partitioning plate 642 having the curved surfaces 647, 648, and a cap 643 having a curved surface 649. A threaded portion 643a is formed in the cap 643, and a threaded portion 641a is formed in the case 641. The cap 643 is fixed to the case 641 by screw coupling the threaded portion 641a and the threaded portion 643a. The lens receiving means 64 is thus partitioned into a curve-shaped first lens receiving chamber 644 and a curve-shaped second lens receiving chamber 645. The liquid holes 650, 652, 654, 655, and 656 are formed in the lens receiving means 64.

As shown in FIG. 15, a plurality of adjacent projection-like stirring wings 660 as a stirring means are provided along approximately along a half circle with predetermined spacings at the external circumference of the lens receiving means 64. A knob groove 643a for handling is formed at the top surface of the cap 643.

In this embodiment, when the motor 30 is rotated, the lens receiving means 64, i.e., the case 641, is rotated at about 3,000 r.p.m. in the direction of an arrow 67 shown in FIG. 15 via the rotary shaft 33. Liquid flow is then generated within the cleaning chamber 163 by the rotation of the stirring wings 660, which flows through the liquid holes 650 to the first lens receiving chamber 644 and to the second lens receiving chamber 645. Consequently, the contact lens W is cleaned. Further, the rinsing process by the rinsing liquid is carried out similarly by the liquid flow generated from the rotation of the stirring wings 660 of the lens receiving means 64. Furthermore, in this third embodiment, as shown in FIG. 14, a plurality of semi-circular shaped protrusions 661 are formed in a ring arrangement at the top surface and the bottom surface of the case 641. The protrusions 661 contact the wall surface 163a of the cleaning chamber 163 and the inner wall surface of the cap 17, and suppress clatter of the case 641 upon the case 641 being rotated.

Figure 17:
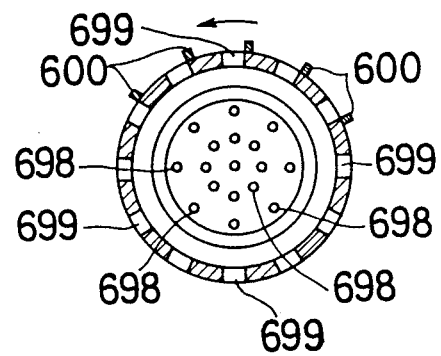
FIG. 17 is a cross sectional view taken along the line XVII—XVII in FIG. 16.
Figure 16:
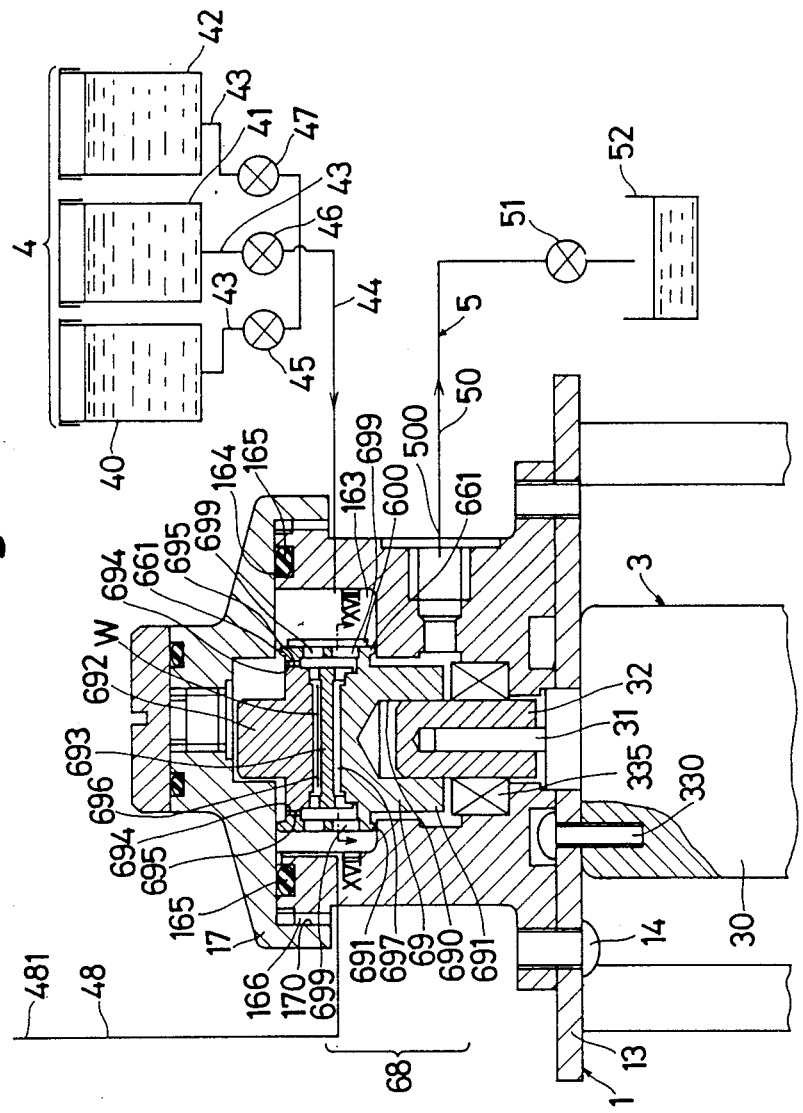
FIG. 16 is a cross sectional view of the essential part of a fourth embodiment of the invention.

A fourth embodiment of the cleaning device of the contact lens according to the present invention is shown in FIGS. 16 and 17. The cleaner of this embodiment shown in FIG. 16 basically is for cleaning the contact lens W with high speed liquid flow similarly to the aforementioned embodiments, and it has a similar operation and effect as the third embodiment. Hereinafter, only differences will be explained.

The fourth embodiment, like the third embodiment, generates a high speed fluid flow within the cleaning chamber 163 by rotating the lens receiving means 69 containing the contact lens W.

That is to say, a cleaning chamber 163 is formed on the top of the lens holding cylindrical means 68 fixed to the fixed base 13 of the housing 1 by screw 14. As it is apparent from FIG. 16, the cleaning chamber 163 is not coaxial with the motor shaft 31 of the motor 30, but is eccentric by a predetermined amount.

A lens receiving means is comprised of a case 691, a cap 692, and a partitioning plate 693. A holding hole 690 in the case 691 is coupled with the rotary shaft 32. A threaded portion 694 is formed at the internal circumference of the case 691, and a threaded portion 695 is formed at the external circumference of the cap 692. The cap 692 is releasably mounted to the case 691 by screw coupling the threaded portion 695 and the threaded portion 694, with the partitioning plate 693 being disposed to the case 691. The lens receiving means 69 is partitioned into the first lens receiving chamber 696 of slim type and the second lens receiving chamber 697 of slim type by the partitioning plate 693. As shown in FIG. 17, a plurality of semi-spherical protrusions 698 are formed on the bottom of chamber 697. Similar protrusions (not shown) are formed on the top of the chamber 696 for the same purpose. The semi-spherical protrusions 698 are for clamping the contact lens by pressure so that the contact lens does not have thrust movement.

As shown in FIG. 16, liquid holes 699 are formed in the case 691. In this embodiment, since both the first lens receiving chamber 696 and the second lens receiving chamber 697 are of the slim type, it is advantageous for suppressing the displacement by the thrust of the contact lens W. Particularly, in the case where the contact lens is a soft contact lens, since the contact lens is distorted by the liquid flow, the thrust displacement of the contact lens can be suppressed surely by closely contacting the wall surfaces of the lens receiving chambers 696 and 697. Moreover, in this embodiment as described above, since the contact lens W is held by pressure with a plurality of semi-spherical protrusion 698, the liquid flows easily between the protrusions 698. Therefore, it is advantageous for cleaning efficiently because the contacting area of the water flow of the cleaning liquid with the surface of the contact lens W can be ensured while maintaining the holding function of the contact lens by the protrusions 698.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the U.S. is:

1. A cleaning device for a contact lens, comprising:
   a housing having a cleaning chamber;
   feeding means connected to said housing for separately feeding at least a cleaning liquid and another liquid into said cleaning chamber;
   drain means in said housing and separate from said feeding means for draining said cleaning chamber;
   a lens receiving container fittable in said cleaning chamber, said lens receiving container having a plurality of apertures positioned for permitting a liquid to freely enter and exit said container;
   stirring means comprising motor driven stirring wings in said cleaning chamber for generating a rapid flow of a liquid in said cleaning chamber; and
   an apertured receiving plate in said cleaning chamber, wherein said receiving plate has means for fixedly holding a lens receiving container positioned in said cleaning chamber such that apertures of said receiving plate are aligned with at least some of said apertures of said lens receiving container,
   whereby said liquid may pass through said apertures and flow past a lens in said lens receiving container to clean said lens.

2. The device of claim 1 wherein said feeding means includes means for feeding a preserving liquid, and including heating means in said housing for heating a liquid in said cleaning chamber.

3. The device of claim 1 including an air outlet in said housing.

4. A cleaning device for a contact lens, comprising:
   a housing having a cleaning chamber;
   feeding means connected to said housing for separately feeding at least a cleaning liquid and another liquid into said cleaning chamber;
   drain means in said housing and separate from said feeding means for draining said cleaning chamber;
   a lens receiving container fittable in said cleaning chamber, said lens receiving container having a plurality of apertures positioned for permitting a liquid to freely enter and exit said container; and
   stirring means in said cleaning chamber for generating a rapid flow of a liquid in said cleaning chamber, said stirring means comprising:
   (a) means for rotating said lens receiving container about an axis eccentric to a center of said cleaning chamber, and
   (b) stirring wings mounted on said lens receiving container,
   whereby said liquid may pass through said apertures and flow past a lens in said lens receiving container to clean said lens.

* * * * *

UNITED STATES PATENT AND TRADEMARK OFFICE
CERTIFICATE OF CORRECTION

PATENT NO. : 4,986,290

DATED : January 22, 1991

INVENTOR(S) : Tomio Oguma et al.

It is certified that error appears in the above-identified patent and that said Letters Patent is hereby corrected as shown below:

On the Title page

The second inventor's city is incorrect, should be, --Toyota--.

Signed and Sealed this

Fifteenth Day of December, 1992

Attest:

DOUGLAS B. COMER

*Attesting Officer*  *Acting Commissioner of Patents and Trademarks*